(12) United States Patent
Ro

(10) Patent No.: US 9,209,496 B2
(45) Date of Patent: Dec. 8, 2015

(54) SORTING MACHINE OF BATTERY CELL AND SORTING METHOD THEREOF

(75) Inventor: Huntae Ro, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 1096 days.

(21) Appl. No.: 12/959,315

(22) Filed: Dec. 2, 2010

(65) Prior Publication Data
US 2011/0234232 A1 Sep. 29, 2011

(30) Foreign Application Priority Data

Mar. 24, 2010 (KR) .................. 10-2010-0026235

(51) Int. Cl.
G01N 27/416 (2006.01)
B07C 5/08 (2006.01)
H02J 7/00 (2006.01)
H01M 10/48 (2006.01)
B07C 5/344 (2006.01)
H01M 10/42 (2006.01)

(52) U.S. Cl.
CPC .............. H01M 10/48 (2013.01); B07C 5/344 (2013.01); H01M 10/42 (2013.01); H01M 10/4207 (2013.01)

(58) Field of Classification Search
CPC .. G01R 31/3627; G01R 31/3648; B07C 5/52; B07C 5/344; H01M 6/52; H01K 3/305
USPC ...................... 324/425, 426, 433; 429/93, 90; 320/132, 106, 107, 110; 340/636.1; 209/575
See application file for complete search history.

(56) References Cited

U.S. PATENT DOCUMENTS 3,215,241 A * 11/1965 Haefele et al. ................. 194/240
4,363,407 A * 12/1982 Buckler et al. ................. 209/3.3
(Continued)

FOREIGN PATENT DOCUMENTS

CN 2285697 Y 7/1998
JP 1999-250929 9/1997
(Continued)

OTHER PUBLICATIONS

Chinese Office Action dated Jan. 14, 2013 for Chinese Patent Application No. CN 201010620034.2 which shares priority of Korean Patent Application KR 10-2010-0026235 with captioned U.S. Appl. No. 12/959,315.

Primary Examiner — Richard Isla Rodas
Assistant Examiner — Michael DiBenedetto
(74) Attorney, Agent, or Firm — Knobbe, Martens, Olson & Bear LLP

(57) ABSTRACT

A battery cell sorting machine includes an inserting unit into which a battery cell is inserted, a measuring unit on which the inserted battery cell is placed, an open circuit voltage (OCV) measuring unit configured to measure an OCV of the battery cell placed on the measuring unit, a loading unit configured to discharge the battery cell placed on the measuring unit, a discharge voltage measuring unit configured to measure a discharge voltage of the battery cell discharged by the loading unit, and a control unit configured to sort battery cells placed on the measuring unit into different groups, wherein the control unit is configured to calculate a voltage differential between the OCV and the discharge voltage of each of the battery cells and to sort the battery cells having corresponding voltage differential ranges between the OCV and the discharge voltage into one group.

12 Claims, 2 Drawing Sheets

(56) References Cited

U.S. PATENT DOCUMENTS

| | | | |
|---|---|---|---|
| 4,376,485 A * | 3/1983 | Shah | 209/575 |
| 5,903,154 A * | 5/1999 | Zhang et al. | 324/437 |
| 6,278,257 B1 * | 8/2001 | Takada et al. | 320/116 |
| 6,469,512 B2 * | 10/2002 | Singh et al. | 324/426 |
| 6,611,128 B2 * | 8/2003 | Minamiura et al. | 320/134 |
| 7,545,146 B2 * | 6/2009 | Klang et al. | 324/426 |
| 2004/0155626 A1 * | 8/2004 | Hedegor et al. | 320/116 |
| 2007/0096743 A1 * | 5/2007 | Arai et al. | 324/426 |
| 2011/0074434 A1 * | 3/2011 | Staton | 324/433 |
| 2013/0015702 A1 * | 1/2013 | Ito | 307/9.1 |

FOREIGN PATENT DOCUMENTS

| | | |
|---|---|---|
| JP | 2001-228224 | 8/2001 |
| JP | 2006-074935 | 3/2006 |
| JP | 2008-235078 | 10/2008 |
| KR | 10-1996-0036191 | 10/1996 |
| KR | 10-2002-0068228 | 8/2002 |
| KR | 10-2003-0034853 | 5/2003 |

* cited by examiner

SORTING MACHINE OF BATTERY CELL AND SORTING METHOD THEREOF

CROSS-REFERENCE TO RELATED APPLICATION

This application claims the benefit of Korean Patent Application No. 10-2010-0026235 filed on Mar. 24, 2010, the contents of which are incorporated herein by reference in their entirety.

BACKGROUND

1. Field

Aspects of the present technology relate to a sorting machine of a battery cell and a sorting method thereof.

2. Description of the Related Technology

In general, a battery pack may be recharged and are widely used for various portable electronic devices such as cellular phones, notebook computers, camcorders, or hybrid electric vehicles.

In order to meet the requirement for high output battery performance, a battery pack typically includes a plurality of battery cells connected to each other. In a battery pack that includes a plurality of battery cells connected in series or parallel to each other, the performance characteristics of the respective battery cells may be different from one another. The quality of the battery pack is then determined by the performance of one cell among the battery cells, that is, the cell having the lowest performance level.

The battery cells forming the battery pack are randomly selected without a separate sorting process. The battery pack manufactured in such a manner may have a rapidly shortened battery life, and the performance characteristics of battery cells constituting the battery pack are not uniform, ultimately lowering the reliability of the product employing the battery cell.

SUMMARY OF THE INVENTION

Aspects of the present invention provide a sorting machine of a battery cell, which can improve the reliability of a product employing the battery cell, and a sorting method thereof.

According to aspects of the present invention, a sorting machine of a battery cell is provided, the sorting machine including an inserting unit into which a battery cell is inserted, a measuring unit on which the inserted battery cell is placed, an open circuit voltage (OCV) measuring unit which measures an OCV of the battery cell placed on the measuring unit, a loading unit configured to discharge the battery cell placed on the measuring unit, a discharge voltage measuring unit configured to measure a discharge voltage of the battery cell discharged by the loading unit, and a control unit configured to sort battery cells placed on the measuring unit into different groups, wherein the control unit is configured to calculate a voltage differential between the OCV and the discharge voltage of each of the battery cells and to sort the battery cells having corresponding voltage differential ranges between the OCV and the discharge voltage into one and the same group.

The control unit may determine as an abnormal battery cell a battery cell having a voltage differential between the OCV and the discharge voltage greater than a reference value.

The battery cell sorting machine may further include a sorting unit configured to move the battery cell of each group sorted by the control unit and to load the battery cell in the corresponding group.

The measuring unit may include a plus terminal connected to a plus terminal of the battery cell and a minus terminal connected to a minus terminal of the battery cell.

The loading unit may include a plus terminal and a minus terminal, a plus terminal of the loading unit may be connected to a plus terminal of the measuring unit, and a minus terminal of the loading unit may be connected to a minus terminal of the measuring unit. In addition, the loading unit may be configured to operate before the discharge voltage measuring unit measures the discharge voltage of the battery cell. The loading unit may be configured to discharge the battery cell for a time period ranging from one second to two seconds.

A data storage unit which stores the OCVs and the discharge voltages may be electrically connected to the control unit.

According to aspects of the present invention, a battery cell sorting method includes determining if a battery cell is inserted into the sorting machine, measuring an open circuit voltage (OCV) of the battery cell, measuring a discharge voltage of the battery cell, calculating a voltage differential between the OCV and the discharge voltage of the battery cell, and sorting battery cells having substantially the same OCV and corresponding voltage differential ranges of the battery cell.

In the measuring step, a loading unit connected to the battery cell may operate to discharge the battery cell. In addition, in the measuring step, the battery cell may be discharged for a time period ranging from one second to two seconds.

Sorting the battery cells can include determining as abnormal battery cells battery cells having a voltage differential greater than a reference value.

Sorting the battery cells can include sorting battery cells having substantially the same OCV, and then sorting into the same group battery cells having corresponding voltage differential ranges among the battery cells having substantially the same OCV. Alternatively, sorting the battery cells can include sorting the battery cells having corresponding voltage differential ranges, and then sorting into the same group battery cells having substantially the same OCV among the battery cells having corresponding voltage differential ranges.

In a sorting machine of a battery cell and a sorting method thereof according to an embodiment of the present invention, open circuit voltages (OCV's) and discharge voltages of the respective battery cells may be measured, and battery cells having corresponding voltage differential ($\Delta V$) ranges between measured values of each of the OCV's and each of the discharge voltages may be sorted into the same group of battery cells.

In addition, because a battery pack is manufactured using the battery cells belonging to the same group, explosion of the battery pack can be prevented and the battery life can be extended.

Additional aspects and/or advantages of the invention will be set forth in part in the description which follows and in part will be obvious from the description or may be learned by practice of the invention.

BRIEF DESCRIPTION OF THE DRAWINGS

The aspects, features and advantages of embodiments of the present invention will be more apparent from the following detailed description in conjunction with the accompanying drawings, in which.

DETAILED DESCRIPTION OF THE INVENTION

Reference will now be made in detail to embodiments of the present invention, examples of which are illustrated in the accompanying drawings, so that this disclosure will be thorough and complete, and will fully convey the scope of the invention to those skilled in the art.

Figure 1:
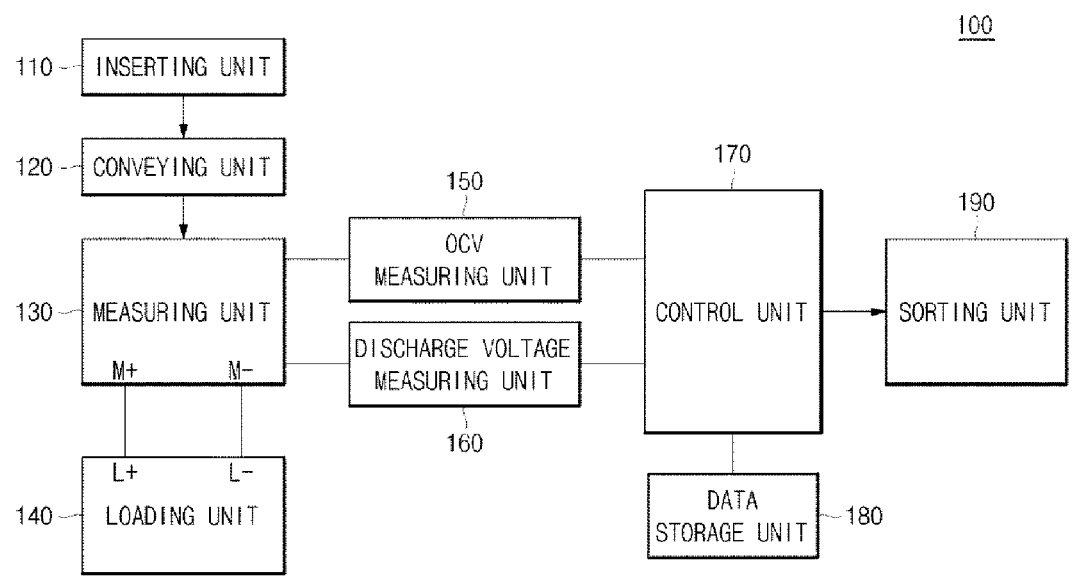
FIG. 1 is a block diagram of a sorting machine of a battery cell according to an embodiment of the present invention.

FIG. 1 is a block diagram of a sorting machine of a battery cell according to an embodiment of the present invention.

Referring to FIG. 1, the battery cell sorting machine 100 according to an embodiment of the present invention may include an inserting unit 110, a conveying unit 120, a measuring unit 130, a loading unit 140, an open circuit voltage (OCV) measuring unit 150, a discharge voltage measuring unit 160, a control unit 170, a data storage unit 180, and a sorting unit 190.

The inserting unit 110 is a portion into which a battery cell may be inserted. Alternatively, a plurality of battery cells may be injected into the inserting unit 110.

The conveying unit 120 can convey the battery cell injected into the inserting unit 110 to the measuring unit 130. The conveying unit 120, which is shaped of rails or tongs, is capable of conveying the battery cell to the measuring unit 130.

The measuring unit 130 is a portion on which the battery cell may be placed for measuring a charged state thereof. The measuring unit 130 may include a plus terminal (M+) and a minus terminal (M−), and the plus terminal M+ thereof may be connected to a plus terminal (B+) of the battery cell and the minus M− thereof may be connected to a minus terminal (B−) of the battery cell. In addition, the measuring unit 130 may also be connected to the loading unit 140 that discharges the battery cell.

The loading unit 140 may be electrically connected to the measuring unit 130, and can discharge the battery cell connected to the measuring unit 130. The loading unit 140 may include a plus terminal (L+) and a minus terminal (L−), and the plus terminal L+ thereof may be connected to the plus terminal M+ of the measuring unit 130 and the minus terminal L− thereof may be connected to the minus terminal M− of the measuring unit 130. The loading unit 140 can discharge the battery cell by command of the control unit 170. Here, the discharge voltage measuring unit 160 can measure a discharge voltage of the battery cell. Here, the discharge voltage of a battery cell may refer to a voltage measured after the battery cell is discharged. A time required for the loading unit 140 to discharge the battery cell may range from approximately 1 second to approximately 2 seconds. Here, if the discharge time is shorter than 1 second, a difference in the discharge time between battery cells may be too small to sort the battery cells. If the discharge time is longer than 2 seconds, the discharge time may become unnecessarily long, which may degrade the performance of the battery cell.

The OCV measuring unit 150 can measure an open circuit voltage (OCV) of the battery cell connected to the measuring unit 130. Here, the OCV refers to a voltage measured in the absence of load applied. Accordingly, if the OCV measuring unit 150 measures the OCV of a battery cell, the loading unit 140 does not operate. If the OCV measuring unit 150 measures the OCV of the battery cell and transmits the measured OCV to the control unit 170, the control unit 170 controls the data storage unit 180 to store the measured OCV.

According to an embodiment, the discharge voltage measuring unit 160 measures a discharge voltage of the battery cell connected to the measuring unit 130. Once the loading unit 140 discharges the battery cell by command of the control unit 170, the discharge voltage measuring unit 160 measures the voltage of the discharged battery cell and transmits the measured discharge voltage to the control unit 170. Then, the control unit 170 controls the data storage unit 180 to store the measured discharge voltage. The discharge voltage measured by the discharge voltage measuring unit 160 is relatively lower than the OCV measured by the OCV measuring unit 150.

The control unit 170 issues a command to the OCV measuring unit 150 to measure the OCV of the battery cell. Then, the control unit 170 issues a command to the loading unit 140 to discharge the battery cell. Once the loading unit 140 discharges the battery cell, the control unit 170 issues a command to the discharge voltage measuring unit 160 to measure the discharge voltage of the battery cell.

The control unit 170 controls the data storage unit 180 to store the OCV's of the battery cells, as measured by the OCV measuring unit 150, and the discharge voltages of the battery cells, as measured by the discharge voltage measuring unit 160. The control unit 170 calculates a voltage differential ΔV between the OCV and the discharge voltage of each of the battery cells and makes the data storage unit 180 store the same.

The control unit 170 sorts batteries cells having the same OCV and the same differential into the same group. According to an embodiment, the OCV's of the battery cells may have values generally in a range from 3.8 V to 3.9 V, but the OCV values are not limited to the range mentioned herein. For example, battery cells having an OCV of 3.802 V and a voltage differential ΔV of 0.05 V may be sorted into one group, while battery cells having an OCV of 3.802 V and a voltage differential ΔV of 0.08 V may be sorted into another group.

When the control unit 170 sorts batteries cells based on the OCV value, an OCV deviation between each of the respective groups may be set to 2 mV. In other words, the respective OCV's of the battery cells may be divided into several voltage ranges, including between 3.8001 V and 3.8020 V, between 3.8021 V and 3.8040 V, and between 3.8041 V and 3.8060 V, and the battery cells belonging to the respective voltage ranges may be sorted into different groups.

When a battery cell has a voltage differential ΔV between the OCV and the discharge voltage greater than a reference value, the control unit 170 may determine the battery cell as an abnormal battery cell. Meanwhile, when a battery cell undergoes a considerable voltage drop after a discharge, that is, when a discharge voltage of the battery cell is lower than the reference value, the battery cell is defective and can be determined as an abnormal battery cell. Here, the reference value may be set by a user and stored in the data storage unit 180.

The control unit 170 can sort the battery cells having the same OCV and the same voltage differential ΔV between the OCV and the discharge voltage into the same group, and a battery pack may be manufactured by the user using the battery cells belonging to the same group. That is, because the battery pack may be manufactured using the battery cells belonging to the same group, and thus exhibit substantially the same performance, the safety of the battery may be improved, thereby preventing explosion of the battery and extending the battery life.

The data storage unit 180 can store the respective OCVs of the battery cells, as measured by the OCV measuring unit 150, and the respective discharge voltages of the battery cells, as measured by the discharge voltage measuring unit 160. In addition, the data storage unit 180 can store the voltage differential ΔV between the OCV and the discharge voltage, as calculated by the control unit 170, and the reference value used for the control unit 170 to determine abnormal battery cells.

The sorting unit 190 moves the battery cells of the respective groups sorted by the control unit 170 to corresponding groups. The sorting unit 190 loads the battery cells having the same OCV and the same voltage differential ΔV between the OCV and the discharge voltage in each group.

Among the battery cells of each group loaded by the sorting unit 190, a constant number of battery cells may be drawn out, thereby forming a battery pack. For example, four cells among the battery cells loaded in the same group may be connected in series, thereby forming a battery pack. Since the battery pack comprises battery cells having substantially the same performance, it can have increased safety and an extended life, compared to a battery pack having unsorted battery cells.

As described above, the battery cell sorting machine 100 according to an embodiment of the present invention may measure OCV's and discharge voltages of the respective battery cells, and sort the battery cells having the same OCV and the same voltage differential ΔV between the OCV and the discharge voltage into the same group.

In addition, since a battery pack may be manufactured using the battery cells belonging to the same group sorted by the sorting machine 100 according to an embodiment of the present invention, explosion of the battery pack can be prevented and battery life can be extended.

A sorting method of a battery cell according to an embodiment of the present invention will next be described.

Figure 2:
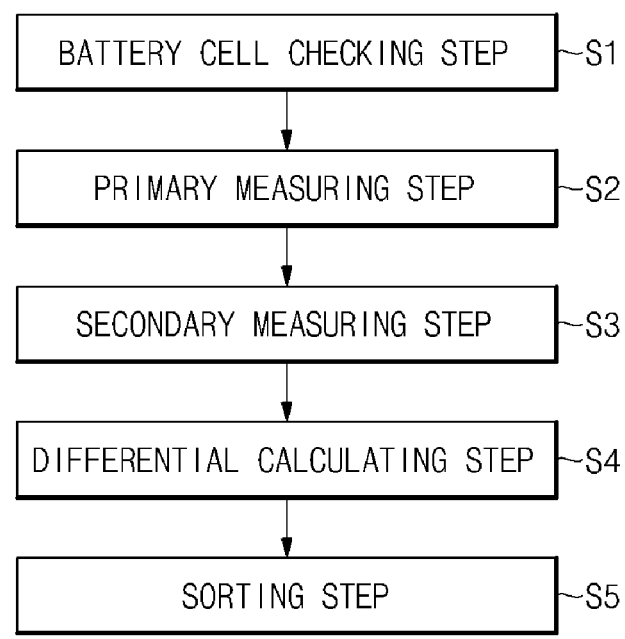
FIG. 2 is a flowchart of a sorting method of a battery cell according to an embodiment of the present invention.

FIG. 2 is a flowchart of a sorting method of a battery cell according to an embodiment of the present invention.

Referring to FIG. 2, a battery cell sorting method according to an embodiment of the present invention may include a battery cell checking step (S1), a primary measuring step (S2), a secondary measuring step (S3), a differential calculating step (S4), and a sorting step (S5).

In the battery cell checking step (S1), the control unit 170 can check for whether a battery cell is inserted into the sorting machine 100 or not. Here, the battery cell may be inserted into the inserting unit 110 by a user, and the inserted battery cell may be moved to the conveying unit 120 to then be placed on the measuring unit 130. Here, a plus terminal (B+) of the inserted battery cell may be connected to a plus terminal (M+) of the measuring unit 130, and a minus terminal (B−) of the inserted battery cell may be connected to a minus terminal (M−) of the measuring unit 130.

In the primary measuring step (S2), the control unit 170 can issue a command to the OCV measuring unit 150 to primarily measure the OCV's of the respective battery cells. Upon receipt of the command from the control unit 170, the OCV measuring unit 150 can measure the OCV's of the respective battery cells to then transmit the measured OCV's to the control unit 170, and the control unit 170 can store the OCV's transmitted from the OCV measuring unit 150 in the data storage unit 180. Here, the loading unit 140 does not operate while the OCV measuring unit 150 measures the OCV's of the respective battery cells.

In the secondary measuring step (S3), the control unit 170 can issue a command to the loading unit 140 to discharge a battery cell. Upon receipt of the command from the control unit 170, the loading unit 140 may discharge the battery cell. Here, the loading unit 140 can discharge the battery cell for one to two seconds. If the discharge time of the battery cell is shorter than one second, the deviation between battery cells may be too small to sort the battery cells into different groups. If the discharge time of the battery cell is longer than two seconds, which is an unnecessarily long discharge time, the performance of the battery cell may deteriorate.

Once the loading unit 140 discharges the battery cell, the control unit 170 can issue a command to the discharge voltage measuring unit 160 to measure a discharge voltage of the battery cell. Here, the discharge voltage refers to a voltage measured after the battery cell may be discharged. The discharge voltage measuring unit 160 can measure the discharge voltage of the battery cell to then transmit the measured discharge voltage to the control unit 170, and the control unit 170 can store the discharge voltage transmitted from the discharge voltage measuring unit 160 to the data storage unit 180.

In the differential calculating step (S4), the control unit 170 can calculate a voltage differential ΔV between each of the OCV's and each of the discharge voltages stored in the data storage unit 180, and can store the calculated voltage differential in the data storage unit 180. The data storage unit 180 can store the OCV's, the discharge voltages and the voltage differentials ΔV between the OCV's and the discharge voltages for the respective battery cells.

In the sorting step (S5), the control unit 170 can sort the battery cells using the data stored in the data storage unit 180. The control unit 170 can sort the battery cells having the same OCV and the same voltage differential ΔV between the OCV and the discharge voltage into the same group.

A process of the control unit 170 sorting the battery cells will now be described in greater detail. The control unit 170 may first sort the battery cells having the same OCV, and then sort the battery cells having the same voltage differential ΔV, among the battery cells having the same OCV, into the same group. Here, the groups sorted by the control unit 170 may include a multiple number of groups, and each of the respective group may have the same voltage differential ΔV between each of the OCV's and each of the discharge voltages.

On the contrary, the control unit 170 may first sort the battery cells having the same voltage differential ΔV, and then sort the battery cells having the same OCV, among the battery cells having the same voltage differential ΔV, into the same group.

In addition, the control unit 170 may determine the battery cells each having the voltage differential ΔV greater than the reference value stored in the data storage unit 180 as abnormal battery cells. Once a battery cell is discharged for one to two seconds, if a discharge voltage of the battery cell is greater than the reference value, the discharged battery cell is a defective battery cell. Accordingly, the control unit 170 sorts out the battery cell. If such a defective battery cell is used to form a battery pack, the battery pack may undergo noticeable deterioration in performance and may be susceptible to explosion. Therefore, in order to avoid these disadvantages, it is advantageous to perform a sorting process of abnormal battery cells.

The sorting unit 190 can identify a battery cell group sorted in the control unit 170 and move the respective battery cells to the corresponding group. Each group sorted by the sorting unit 190 can include battery cells loaded therein, the battery cells having the same OCV and the same voltage differential ΔV between the OCV and the discharge voltage. Among the battery cells loaded in each group, a constant number of battery cells may be drawn out, thereby forming a battery pack. The battery pack has superb performance and an extended life, compared to a battery pack constituted by unsorted battery cells.

As described above, in the battery cell sorting method according to an embodiment of the present invention, OCV's and discharge voltages of the respective battery cells may be measured, and the battery cells having the same OCV and the same voltage differential ΔV between the OCV and the discharge voltage may be sorted into the same group.

In addition, since the battery pack is manufactured using the battery cells belonging to the same group sorted by the battery cell sorting method according to an embodiment of the present invention, explosion of the battery can be prevented and the battery life can be extended. Accordingly, the reliability of a product employing the battery cell can be improved.

Although the sorting machine of a battery cell and the sorting method thereof according to the present invention has been described with reference to particular embodiments, it should be understood by those skilled in the art that a variety of modifications and variations may be made to the present invention without departing from the spirit or scope of the present invention defined in the appended claims, and their equivalents.

What is claimed is:

1. A sorting machine of a battery cell comprising:
an inserting unit into which a battery cell is inserted;
a measuring unit on which the inserted battery cell is placed;
an open circuit voltage (OCV) measuring unit configured to measure an OCV of the battery cell placed on the measuring unit;
a loading unit configured to discharge the battery cell placed on the measuring unit by applying a fixed load to the battery cell;
a discharge voltage measuring unit configured to measure a discharge voltage of the battery cell discharged by the loading unit; and
a control unit configured to sort battery cells placed on the measuring unit into different groups,
wherein the control unit is configured to calculate a voltage differential between the OCV and the discharge voltage of each of the battery cells and to sort the battery cells having corresponding voltage differential ranges between the OCV and the discharge voltage into one group,
wherein the loading unit is configured to discharge the battery cell for a time period ranging from one second to two seconds;
a sorting unit which is configured to move the battery cells of each group sorted by the control unit and load the battery cells in a corresponding group and wherein the control unit and sorting unit sorts the batteries into groups based u on the OCV and the voltage differential between the OCV and the discharge voltage so that batteries having corresponding OCV values and voltage differential values are assembled into the same groups.

2. The battery cell sorting machine of claim 1, wherein the control unit is configured to determine a battery cell having a voltage differential between the OCV and the discharge voltage greater than a reference value as an abnormal battery cell.

3. The battery cell sorting machine of claim 1, further comprising a sorting unit which is configured to move the battery cell of each group sorted by the control unit and to load the battery cell in a corresponding group.

4. The battery cell sorting machine of claim 1, wherein the measuring unit includes a plus terminal connected to a plus terminal of the battery cell and a minus terminal connected to a minus terminal of the battery cell.

5. The battery cell sorting machine of claim 1, wherein the loading unit includes a plus terminal and a minus terminal, wherein the plus terminal of the loading unit is connected to a plus terminal of the measuring unit, and wherein the minus terminal of the loading unit is connected to a minus terminal of the measuring unit.

6. The battery cell sorting machine of claim 1, wherein the loading unit is configured to operate before the discharge voltage measuring unit measures the discharge voltage of the battery cell.

7. The battery cell sorting machine of claim 1, wherein a data storage unit configured to store the OCV's and the discharge voltages is electrically connected to the control unit.

8. A battery cell sorting method comprising:
determining if a battery cell is inserted into a sorting machine;
primarily measuring an open circuit voltage (OCV) of a battery cell;
secondarily measuring a discharge voltage of the battery cell by applying a fixed load to the battery cell;
calculating a voltage differential between the OCV and the discharge voltage of the battery cell; and
sorting battery cells having substantially the same OCV and corresponding voltage differential ranges into groups of batteries having corresponding OCV and voltage differential ranges,
wherein secondarily measuring comprises discharging the battery cell for a time period ranging from one second to two seconds.

9. The battery cell sorting method of claim 8, wherein secondarily measuring comprises discharging the battery cell by operating a loading unit that is connected to the battery cell.

10. The battery cell sorting method of claim 8, wherein sorting the battery cells comprises determining battery cells having a voltage differential greater than a reference value as abnormal battery cells.

11. The battery cell sorting method of claim 8, wherein sorting the battery cells comprises sorting the battery cells having substantially the same OCV, and then sorting into one group the battery cells having corresponding voltage differential ranges among the battery cells having substantially the same OCV.

12. The battery cell sorting method of claim 8, wherein sorting the battery cells comprises sorting the battery cells having substantially the same voltage differential, and then sorting into one group the battery cells having substantially the same OCV among the battery cells having corresponding voltage differential ranges.

* * * * *